(12) United States Patent
Jancsy

(10) Patent No.: US 11,288,975 B2
(45) Date of Patent: Mar. 29, 2022

(54) ARTIFICIALLY INTELLIGENT MUSIC INSTRUCTION METHODS AND SYSTEMS

(71) Applicant: Aleatoric Technologies LLC, Brecksville, OH (US)

(72) Inventor: Michael Jancsy, Brecksville, OH (US)

(73) Assignee: Aleatoric Technologies LLC, Brecksville, OH (US)

( * ) Notice: Subject to any disclaimer, the term of this patent is extended or adjusted under 35 U.S.C. 154(b) by 95 days.

(21) Appl. No.: 16/551,980

(22) Filed: Aug. 27, 2019

(65) Prior Publication Data

US 2020/0074876 A1 Mar. 5, 2020

Related U.S. Application Data

(60) Provisional application No. 62/726,845, filed on Sep. 4, 2018.

(51) Int. Cl.
*G09B 15/02* (2006.01)
*G10H 1/00* (2006.01)

(52) U.S. Cl.
CPC ......... *G09B 15/023* (2013.01); *G10H 1/0008* (2013.01); *G10H 2210/066* (2013.01);
(Continued)

(58) Field of Classification Search
CPC ............... G09B 15/023; G10H 1/0008; G10H 2210/066; G10H 2210/071;
(Continued)

(56) References Cited

U.S. PATENT DOCUMENTS 4,024,789 A 5/1977 Humphrey et al.
5,521,323 A 5/1996 Paulson et al.
(Continued)

OTHER PUBLICATIONS

Judith C. Brown, "An efficient algorithm for the calculation of a constant Q transform," J. Acoust. Soc. Am. 92 (5), Nov. 1992.
(Continued)

*Primary Examiner* — Jianchun Qin
(74) *Attorney, Agent, or Firm* — Ellenoff Grossman & Schole LLP; James M. Smedley; Alex Korona

(57) ABSTRACT

Apparatus and associated methods relate to comparing a musical score model to a captured performance of the musical score, calculating a degree of similarity between the musical score model and the captured performance based on the comparison, and automatically evaluating the captured performance based on the degree of similarity and musical score degree of difficulty determined as a function of the musical score entropy. In an illustrative example, a musician may be learning to play the musical score. The musical score may be modelled, for example, based on pitch, volume, and rhythm, permitting comparison to the captured performance of the musical score. In some examples, the musical score degree of difficulty may be adapted based on the captured performance evaluation. Some embodiments may generate musical scores based on the captured performance evaluation. Various examples may advantageously provide corrective instruction based on the degree of difficulty and the captured performance evaluation.

16 Claims, 7 Drawing Sheets

(52) U.S. Cl.
CPC . *G10H 2210/071* (2013.01); *G10H 2210/076* (2013.01); *G10H 2210/091* (2013.01); *G10H 2220/091* (2013.01)

(58) Field of Classification Search
CPC ....... G10H 2210/076; G10H 2210/091; G10H 2220/091
See application file for complete search history.

(56) References Cited

U.S. PATENT DOCUMENTS

| | | | |
|---|---|---|---|
| 5,574,238 | A | 11/1996 | Mencher |
| 6,066,791 | A | 5/2000 | Renard et al. |
| 6,388,181 | B2 | 5/2002 | Moe |
| 6,751,439 | B2 | 6/2004 | Tice et al. |
| 6,856,923 | B2 | 2/2005 | Jung |
| 6,987,220 | B2 | 1/2006 | Holcombe |
| 7,893,337 | B2 | 2/2011 | Lenz |
| 8,119,896 | B1 | 2/2012 | Smith |
| 8,438,168 | B2 | 5/2013 | Cai et al. |
| 8,642,871 | B2 | 2/2014 | Feidner |
| 8,697,972 | B2 | 4/2014 | Dripps et al. |
| 8,859,872 | B2 | 10/2014 | Williams |
| 9,492,756 | B2 | 11/2016 | Izkovsky et al. |
| 9,767,705 | B1 | 9/2017 | Klapuri et al. |
| 2005/0081702 | A1* | 4/2005 | Jung ........................ G10H 1/00 84/616 |
| 2008/0200224 | A1 | 8/2008 | Parks |
| 2010/0137049 | A1 | 6/2010 | Epstein |
| 2011/0036231 | A1* | 2/2011 | Nakadai ................ G10H 1/361 84/477 R |
| 2011/0207513 | A1 | 8/2011 | Cross et al. |
| 2012/0135789 | A1 | 5/2012 | Feidner |
| 2012/0141959 | A1* | 6/2012 | von Ahn Arellano ....................... G09B 19/06 434/157 |
| 2012/0295679 | A1 | 11/2012 | Izkovsky |
| 2014/0033899 | A1 | 2/2014 | Dripps et al. |
| 2014/0041511 | A1 | 2/2014 | Kaipainen et al. |
| 2014/0190334 | A1 | 7/2014 | Feidner |
| 2017/0221377 | A1* | 8/2017 | Uemura ................ G10H 1/0008 |
| 2017/0345329 | A1 | 11/2017 | Lee et al. |
| 2018/0341702 | A1 | 11/2018 | Sawruk et al. |

OTHER PUBLICATIONS

Susanne M. Jaeggi, et al., "Improving fluid intelligence with training on working memory," www.pnas.org cgi doi 10.1073 pnas. 0801268105, PNAS May 13, 2008 vol. 105 No. 19 6829-6833.
Arnaud Dessein, Arshia Cont, Guillaume Lemaitre. Real-time polyphonic music transcription with non-negative matrix factorization and beta-divergence. ISMIR—11th International Society for Music Information Retrieval Conference, Aug. 2010, Utrecht, Netherlands. pp. 489-494, 2010. <hal-00708682>.

* cited by examiner

ARTIFICIALLY INTELLIGENT MUSIC INSTRUCTION METHODS AND SYSTEMS

CROSS-REFERENCE TO RELATED APPLICATIONS

This application claims the benefit of U.S. Provisional Patent Application No. 62/726,845, titled "Artificially Intelligent Music Instruction Methods and Systems," filed by Applicant: Michael Jancsy, on Sep. 4, 2018, Inventor: Michael Jancsy.

This application incorporates the entire contents of the above-referenced application herein by reference.

TECHNICAL FIELD

Various embodiments relate generally to music instruction.

BACKGROUND

Music is an expression of sounds. Musical sounds may be expressed in various forms. Some music may include sounds emitted by a musical instrument. A musical instrument may be, for example, a wind instrument, a human voice, a percussion instrument of any kind, or any other musical instrument type. In various scenarios, musical sounds may be encoded in a representation useful for reproducing the musical sounds. In some examples, a collection of musical sounds may be referred to as a musical segment. Some encoded musical sound segment representations may be referred to as a musical score. In an illustrative example, a musical sound segment may be referred to as a song.

Songs may be characterized based on variation of the pitch, rhythm, or volume of the song's musical sounds. A musical score may encode a song's variation of pitch, rhythm, or volume during the song as notes to be reproduced. In an illustrative example, a song's pitch, rhythm, or volume characteristics may vary over time during the song. Some songs include periods of silence interspersed with sound variations. An accurate reproduction of a song may include the timing, frequency, volume, and silence characteristics encoded in a musical score.

An individual operating a musical instrument to reproduce sounds of a musical segment or song may be a musician. A musician may play a musical instrument to reproduce a song from memory, or from a musical score. A musician learning to play a musical instrument to accurately reproduce songs may be a music student. In some scenarios, a music student may need to learn to play their instrument and learn to interpret the musical score, to be able to perform a song accurately. In an illustrative example, a music student may expend much time and effort playing music and comparing their performance to an example provided by a music instructor.

SUMMARY

Apparatus and associated methods relate to comparing a musical score model to a captured performance of the musical score, calculating a degree of similarity between the musical score model and the captured performance based on the comparison, and automatically evaluating the captured performance based on the degree of similarity and musical score degree of difficulty determined as a function of the musical score entropy. In an illustrative example, a musician may be learning to play the musical score. The musical score may be modelled, for example, based on pitch, volume, and rhythm, permitting comparison to the captured performance of the musical score. In some examples, the musical score degree of difficulty may be adapted based on the captured performance evaluation. Some embodiments may generate musical scores based on the captured performance evaluation. Various examples may advantageously provide corrective instruction based on the degree of difficulty and the captured performance evaluation.

Various embodiments may achieve one or more advantages. For example, some embodiments may reduce a music student's effort learning sight reading. This facilitation may be a result of providing improved objective feedback and progress measurements during sight reading training. In some embodiments, sight reading practice may be automatically guided. Such automatic sight-reading training practice guidance may reduce a music student's effort maintaining focus. Various embodiments may reduce a music student's cost obtaining practice music. Such reduced music cost may be a result of providing additional practice music generated at zero marginal cost. In an illustrative example, some embodiments may improve the effectiveness of a music student's practice. This facilitation may be a result of providing practice music customized by artificial intelligence configured to generate music tailored to a music student's proficiency and preference. Some embodiments may improve assessment of a music student's proficiency. Such improved proficiency assessment may be a result of measuring music difficulty based on information-theoretic criteria such as entropy. For example, various implementations may vary the difficulty level of songs presented to a music student based on the song entropy.

In an illustrative example, some embodiments may reduce the effort required to generate instructional music tailored to a music student's proficiency level. This facilitation may be a result of an easily automated method to measure music difficulty as a function of song entropy. Various embodiments may increase the measurement precision of a music student's proficiency. Such increased proficiency measurement precision may be a result of an information-theoretic music difficulty measurement method. In an illustrative example, some embodiments may enhance a music student's learning by providing objective feedback and corrective instruction. Such enhanced learning based on objective feedback may be a result of a music difficulty calculation based on a song entropy measurement calculated as a function of the song modelled as a discrete random variable. Various embodiments may reduce the effort required by developers implementing a music instruction method or apparatus. Such reduced music instruction method or apparatus implementation effort may be a result of music difficulty calculation based on entropy. In an illustrative example, a music difficulty calculation based on entropy may provide simpler implementations as a result of measuring complexity in bits of information, contrasted with other measures which may not provide a measurement in bits of information.

Some embodiments may reduce a music student's effort learning to play a particular music piece. Such reduced music piece learning effort may be a result of providing objective feedback and progress measurement during musical piece training. In an illustrative example, a music student's effort to maintain focus during piece training may be reduced. This facilitation may be a result of guided piece training practice. Some embodiments may improve the relevance of feedback to a music student's performances. Such improved feedback relevance may be a result of synthesizing a corrected version of incorrect portions of the music student's performance and playing back the corrected version for the student. In various implementations, a music student's working memory or fluid intelligence may be enhanced. This facilitation may be a result of presenting the music student with a musical stimulus sequence adapted to the student's indications of receiving prior stimuli. In an illustrative example, some embodiments may reduce a music instructor's effort tracking a music student's progress. Such reduced music student progress tracking effort may be a result of aggregated student achievement metrics measuring on a note-by-note and measure-by-measure level how each student and group of students are progressing. Various embodiments may improve a music student's effectiveness practicing wind instrument long tones. This facilitation may be a result of comparing tone quality performed by a student to a reference, and providing advice suggesting tone improvements.

Throughout the present disclosure, the term "musical instrument" is to be interpreted broadly to include human voice, wind instruments, percussion instruments of any kind, or any other musical instrument.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an illustrative music instruction system comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy is briefly introduced with reference to FIG. 1. Second, with reference to FIGS. 2-3, the discussion turns to exemplary embodiments that illustrate music instruction system designs. Specifically, music instruction network topology and music instruction device structural designs are presented. Then, with reference to FIGS. 4-7, illustrative Artificially Intelligent Musical Instruction Engine (AIMIE) designs are disclosed, to explain improvements in music instruction technology.

Figure 1:
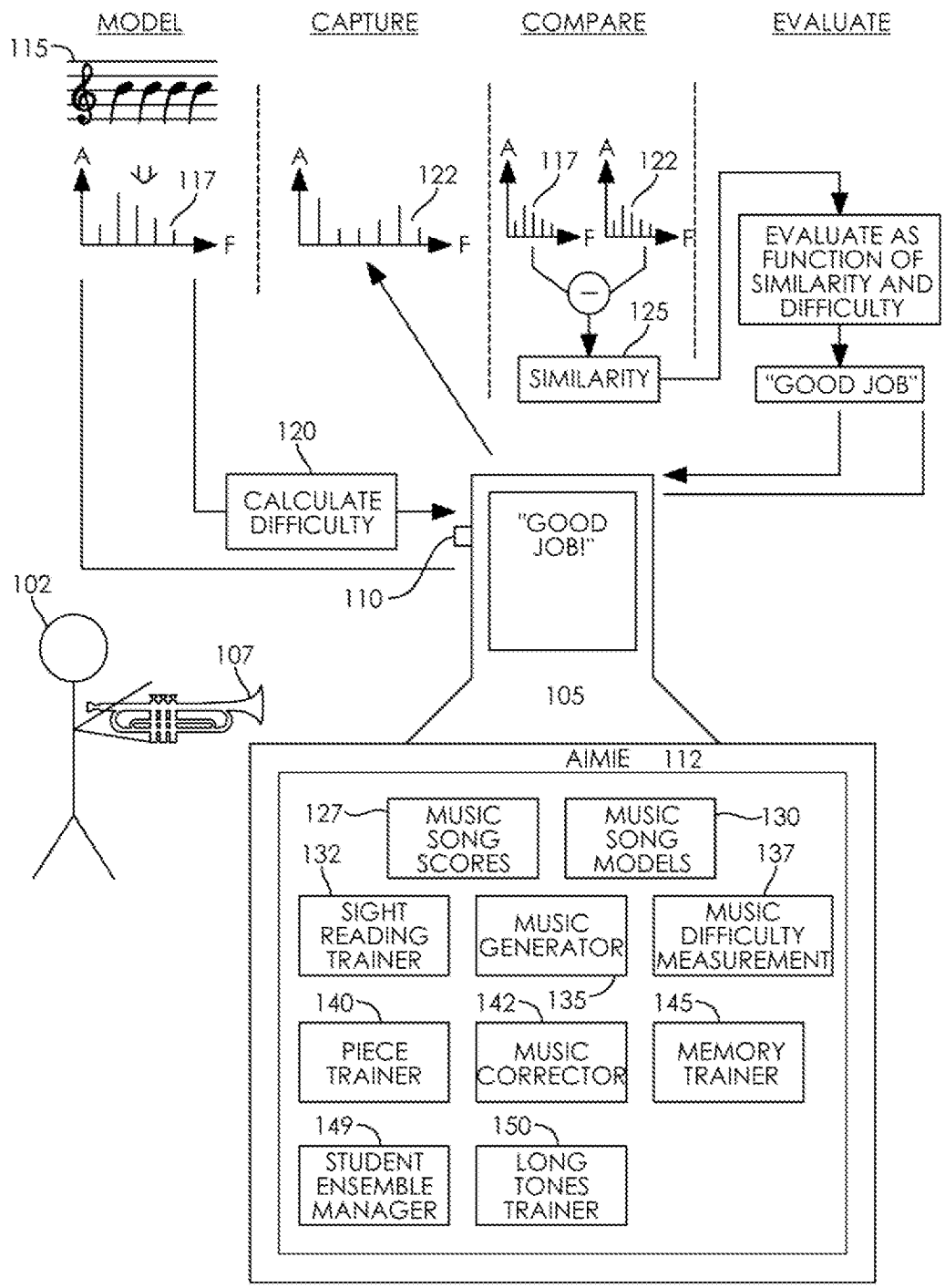
FIG. 1 depicts an exemplary music instruction apparatus comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy.

FIG. 1 depicts an exemplary music instruction apparatus comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy. In the example illustrated by FIG. 1, the music student 102 receives music instruction from the exemplary music instruction device 105. In the depicted example, the music instruction received by the music student 102 from the music instruction device 105 is a music sight reading lesson. In the illustrated example, the music student 102 plays the musical instrument 107. In the depicted embodiment, the music instruction device 105 includes microphone 110 configured to capture the musical instrument 107 sound. In the illustrated embodiment, the music instruction device 105 includes the exemplary Artificially Intelligent Musical Instruction Engine (AIMIE) 112 configured to present music segment score 115 to the music student 102. In the illustrated example, the music student 102 plays the music segment score 115 on the musical instrument 107 while sight reading the music segment score 115 presented by the AIMIE 112. In the depicted embodiment, the AIMIE 112 creates music segment score reference model 117 as a function of the music segment score 115. In the depicted embodiment, the music segment score reference model 117 is a frequency domain audio model constructed based on a Fourier transform. In the illustrated embodiment, the AIMIE 112 processes the musical instrument 107 sound captured by the music instruction device 105 microphone 110. In the depicted embodiment, the AIMIE 112 creates the student performance model 122 as a function of the sound captured by the music instruction device 105 microphone 110. In the illustrated embodiment, the student performance model 122 is a frequency domain audio model constructed based on a Fourier transform. In some embodiments, the music segment score reference model 117 and the student performance model 122 may be predictive analytic models, decision trees, neural networks, capsule networks, time domain models, frequency domain models, or matrix models. In the illustrated embodiment, the AIMIE 112 compares the student performance model 122 and the reference model 117, to measure the degree of similarity 125 between the student performance model 122 and the reference model 117. In the depicted embodiment, the AIMIE 112 compares the measured degree of similarity 125 between the student performance model 122 and the reference model 117 to a threshold determined as a function of music student 102 historical performance, to determine if the music student's sight reading performance was acceptable. In the illustrated embodiment, the exemplary music instruction device 105 stores the music segment score 115 with the music song scores 127 configured in the music instruction device 105. In the depicted embodiment, the exemplary music instruction device 105 stores the student performance model 122 and the reference model 117 with the music song models 130 configured in the music instruction device 105. In some examples, the illustrated embodiment music instruction device 105 sight reading trainer 132 may provide corrective instruction or feedback to the music student 102 based on the AIMIE 112 evaluation of the degree of similarity 125. In the illustrated example, the AIMIE 112 indicates "GOOD JOB" to the student 102 via the music instruction device 105 in response to the AIMIE 112 determination the student 102 performance was acceptable. In some embodiments, the sight reading trainer 132 may be omitted. In the illustrated embodiment, the exemplary music instruction device 105 includes the music generator 135 configured to generate musical passages intended for a musician to practice playing. In various embodiments, the music generator 135 may be configured to generate an audio model as a function of a music segment score. In some implementations, the music generator 135 may be configured to generate a music segment score as a function of a difficulty level. In some embodiments, the music generator 135 may be omitted. In the depicted embodiment, the exemplary music instruction device 105 includes music difficulty measurement 137 configured to measure how difficult a music segment is to play. In some embodiments, the music difficulty measurement 137 may determine the measured difficulty of a music segment based on a calculation of an information-theoretic property of the music segment. In an illustrative example, the music segment information-theoretic property used to determine the music segment difficulty level may be determined as a function of entropy. In some embodiments, the music segment difficulty level may be determined based on a function of Shannon entropy or related measures. In various embodiment scenarios, entropy's mathematical formula may be advantageous because its unit of measure, bits, is a widely understood measure of information content, and it has theoretical grounding in the field of information theory and probability modelling. Some embodiments of this system may yield comparable performance using a formula equal to a monotonic transformation of entropy, such as, for example, Gini Impurity, especially those which preserve entropy's symmetry, although without the aforementioned benefits of entropy. In some embodiments, the information theoretic property used to determine the music segment difficulty level may be determined as a function of Gini Impurity. In some implementations of the music instruction device 105 and sight reading trainer 132, corrective instruction or feedback provided to the music student 102 may be determined as a function of the music segment difficulty level determined by the music difficulty measurement 137. In various embodiments, the music difficulty measurement 137 may be omitted. In some embodiments, the difficulty of the music generated by the music generator 135 may be tailored to a musician's ability. In various examples, the music generator 135 may be combined with the music difficulty measurement method 137 to generate music of a specified difficulty. In the illustrated embodiment, the exemplary music instruction device 105 includes the piece trainer 140 adapted to help a musician learn a piece of music. In some designs, the piece trainer 140 may present to the music student 102 segments of a musical piece selected by the student 102. In various embodiments, the piece trainer 140 may repeatedly present segments of the piece to the student 102, at tempos and durations to match the measured ability of the student 102. In various designs, the piece trainer 140 may be omitted. In the depicted embodiment, the exemplary music instruction device 105 includes the music corrector 142 configured to record the student 102 attempting to play a passage of music and "correct" the portions of the music which music corrector 142 determines incorrect. In some embodiments, the music corrector 142 may play back the corrected portions of the recording to demonstrate to the student 102 how to correctly play the passage. In some embodiments, the music corrector may be omitted. In the illustrated embodiment, the exemplary music instruction device 105 includes the memory trainer 145 configured to improve the working memory, fluid intelligence, ability to sight read, and ability to memorize music passages, of the student 102. In various embodiments, the memory trainer 145 may present a sequence of musical stimuli to the student 102 and instruct the student 102 to indicate to the application every time a musical stimulus is the same as the one from a designated number of steps earlier in the sequence. In various embodiments, the memory trainer 145 may be omitted. In the depicted embodiment, the exemplary music instruction device 105 includes the student ensemble manager 149 adapted to track the learning progress of a music teacher's students. In some embodiments, the student ensemble manager 149 may be paired with the sight reading trainer 132 and the piece trainer 140 to allow a music teacher to track how their students are progressing through the sight reading trainer 132 and the piece trainer 140 lessons. In various embodiments, the student ensemble manager 149 may be omitted. In the illustrated embodiment, the exemplary music instruction device 105 includes the long tones trainer 150 configured to help a musician practice a "long tones" exercise performed by wind players. In an illustrative example, a wind instrument musician performing a "long tones" exercise may play each note on their instrument as long as possible while maintaining proper intonation and tone quality. In some embodiments, the long tones trainer 150 may measure the music student 102 student tone quality by comparing the power spectrum of the recorded audio to a predetermined baseline power spectrum. In various embodiments, the long tones trainer 150 may display measurements of the student 102 tone quality for each note, with advice to improve the tone. In some designs, the long tones trainer 150 may be omitted.

Figure 2:
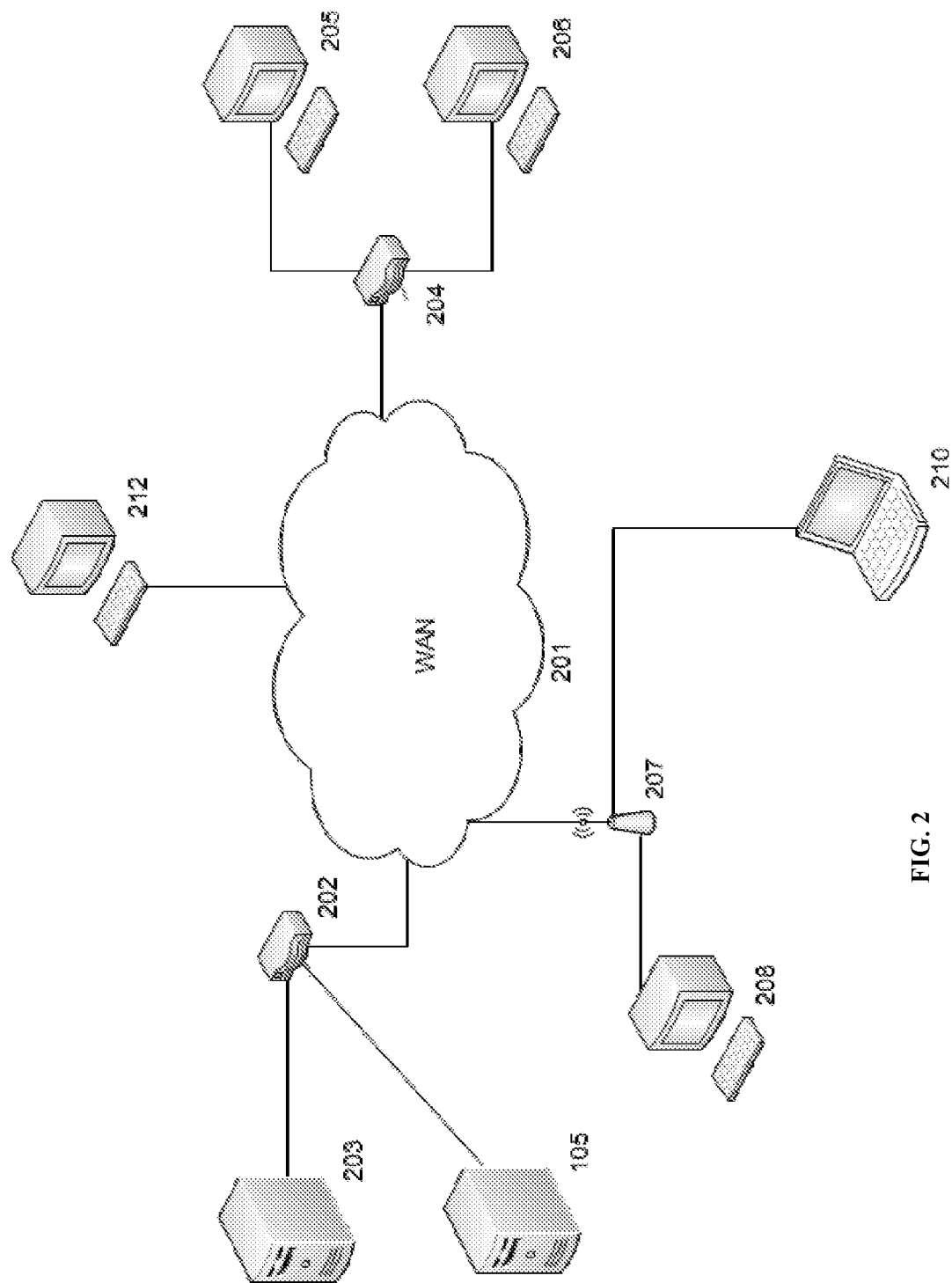
FIG. 2 depicts a schematic view of an exemplary music instruction network configured with an exemplary music instruction apparatus adapted to comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy.

FIG. 2 depicts a schematic view of an exemplary music instruction network configured with an exemplary music instruction apparatus adapted to comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy. In FIG. 2, according to an exemplary embodiment of the present disclosure, data may be transferred to the system, stored by the system and/or transferred by the system to users of the system across local area networks (LANs) or wide area networks (WANs). In accordance with the previous embodiment, the system may be comprised of numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In depicted embodiment, an exemplary system includes the exemplary computing device 105 adapted to comparing a musical score model to a captured performance of the musical score, calculating a degree of similarity between the musical score model and the captured performance based on the comparison, and automatically evaluating the captured performance based on the degree of similarity and the musical score degree of difficulty determined as a function of the musical score entropy. In the illustrated embodiment, the device 105 is communicatively and operably coupled with the WAN 201 (e.g., the Internet) to send, retrieve, or manipulate information in storage devices, servers, and network components, and exchange information with various other systems and devices via the WAN 201. In the depicted example, the illustrative system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet). According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. In various implementations, router(s) 202 may be optional, and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed. Components or modules of the system may connect to device 105 or server 203 via WAN 201 or other network in numerous ways. For instance, a component or module may connect to the system i) through a computing device 212 directly connected to the WAN 201, ii) through a computing device 205, 206 connected to the WAN 201 through a routing device 204, or iii) through a computing device 208, 210 connected to a wireless access point 207. One of ordinary skill in the art will appreciate that there are numerous ways that a component or module may connect to device 105 or server 203 via WAN 201 or other network, and embodiments of the present disclosure are contemplated for use with any method for connecting to device 105 or server 203 via WAN 201 or other network. Furthermore, device 105 or server 203 could be comprised of a personal computing device, such as a smartphone, acting as a host for other computing devices to connect to. The communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
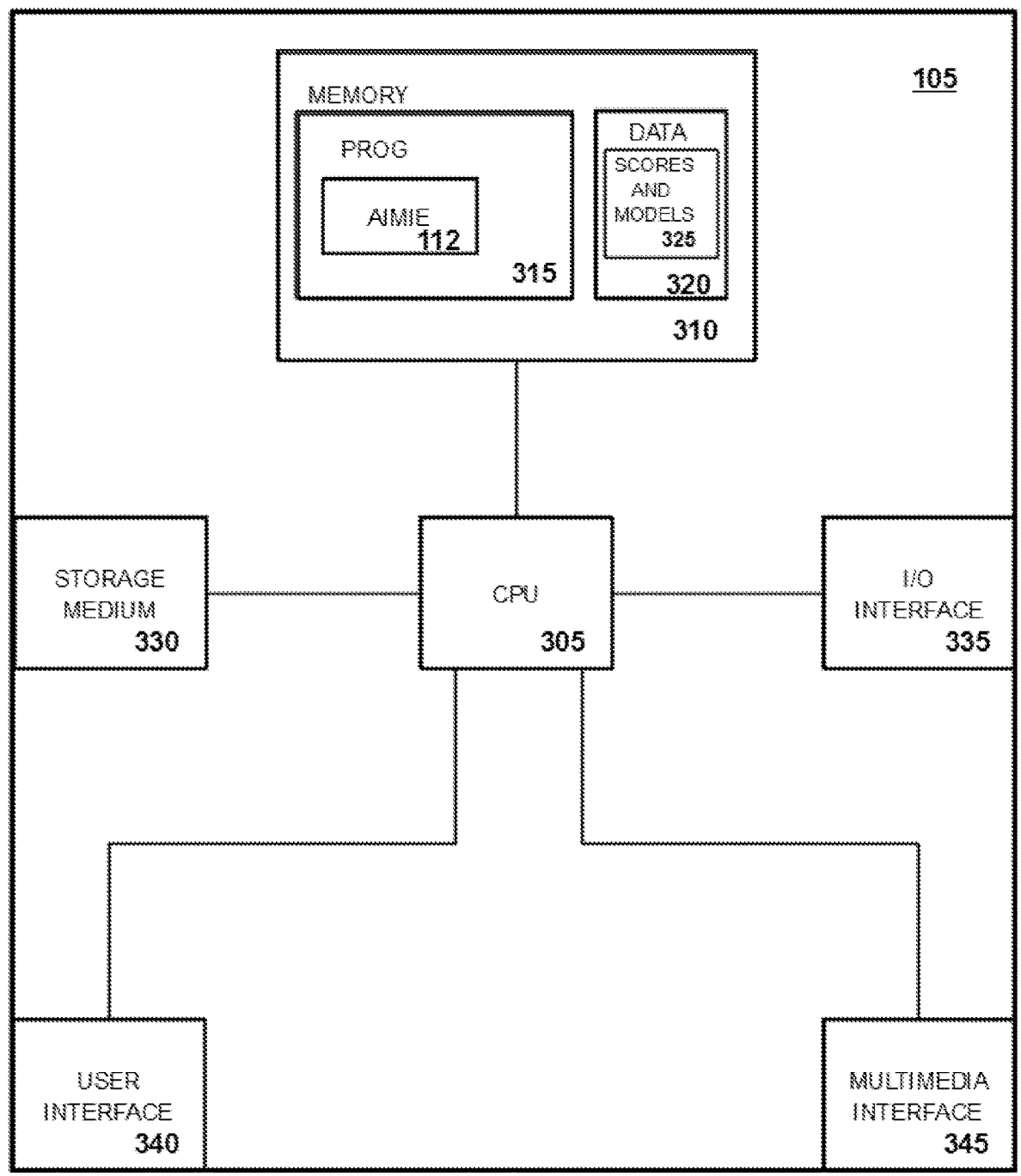
FIG. 3 depicts a structural view of an exemplary computing device configured with an Artificially Intelligent Musical Instruction Engine (AIMIE) to compare a musical score model to a captured performance of the musical score, calculate a degree of similarity between the musical score model and the captured performance based on the comparison, and automatically evaluate the captured performance based on the degree of similarity and the musical score degree of difficulty determined as a function of the musical score entropy.

FIG. 3 depicts a structural view of an exemplary computing device configured with an Artificially Intelligent Musical Instruction Engine (AIMIE) to compare a musical score model to a captured performance of the musical score, calculate a degree of similarity between the musical score model and the captured performance based on the comparison, and automatically evaluate the captured performance based on the degree of similarity and the musical score degree of difficulty determined as a function of the musical score entropy. In FIG. 3, the block diagram of the exemplary computing device 105 includes processor 305 and memory 310. The processor 305 is in electrical communication with the memory 310. The depicted memory 310 includes program memory 315 and data memory 320. The depicted program memory 315 includes processor-executable program instructions implementing AIMIE (Artificially Intelligent Musical Instruction Engine) 112. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the illustrated embodiment, the depicted data memory 320 includes scores and models 325. In the illustrated embodiment, the depicted scores and models 325 includes musical song scores and musical song models. In some embodiments, the musical song scores may include digital representations of musical notation useful for music performance by a human musician or music reproduction by an automated music performance apparatus. In various embodiments, the musical song models may include digital representations of music pitch, rhythm, and volume. In the depicted embodiment, the processor 305 is communicatively and operably coupled with the storage medium 330. In the depicted embodiment, the processor 305 is communicatively and operably coupled with the user interface 340. In the depicted embodiment, the processor 305 is communicatively and operably coupled with the I/O (Input/Output) module 335. In the depicted embodiment, the I/O module 335 includes a network interface. In various implementations, the network interface may be a wireless network interface. In some designs, the network interface may be a Wi-Fi interface. In some embodiments, the network interface may be a Bluetooth interface. In an illustrative example, the device 105 may include more than one network interface. In some designs, the network interface may be a wireline interface. In some designs, the network interface may be omitted. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the device 105 may include an accelerometer operably coupled with the processor 305. In various embodiments, the device 105 may include a GPS module operably coupled with the processor 305. In an illustrative example, the device 105 may include a magnetometer operably coupled with the processor 305. In some embodiments, some or all parts of an exemplary device 105 may be included within a client device, such that the functionalities could operate in a distributed manner. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the device 105. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated device 105 include, but are not limited to, personal computers, servers, tablet PCs, smartphones, or other computing devices. In some embodiments, multiple exemplary devices 105 may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary device 105 design may be realized in a distributed implementation. In an illustrative example, some device 105 designs may be partitioned between a client device, such as, for example, a phone, and, a more powerful server system, such as server 203, depicted in FIG. 2. In various designs, a device 105 partition hosted on a PC or mobile device may choose to delegate some parts of computation, such as, for example, machine learning or deep learning, to a hosting server. In some embodiments, a client device 105 partition may delegate computation-intensive tasks to a host server to take advantage of a more powerful processor, or to offload excess work. In an illustrative example, some mobile devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some device 105 features. However, in some embodiments, an exemplary device 105 may be configured to operate on device with less processing power, such as, for example, various gaming consoles, which may not have sufficient processor power, or a suitable CPU architecture, to adequately support device 105 requirements. Various embodiment device 105 designs configured to operate on a such a device with reduced processor power may work in conjunction with a more powerful server system.

Figure 4:
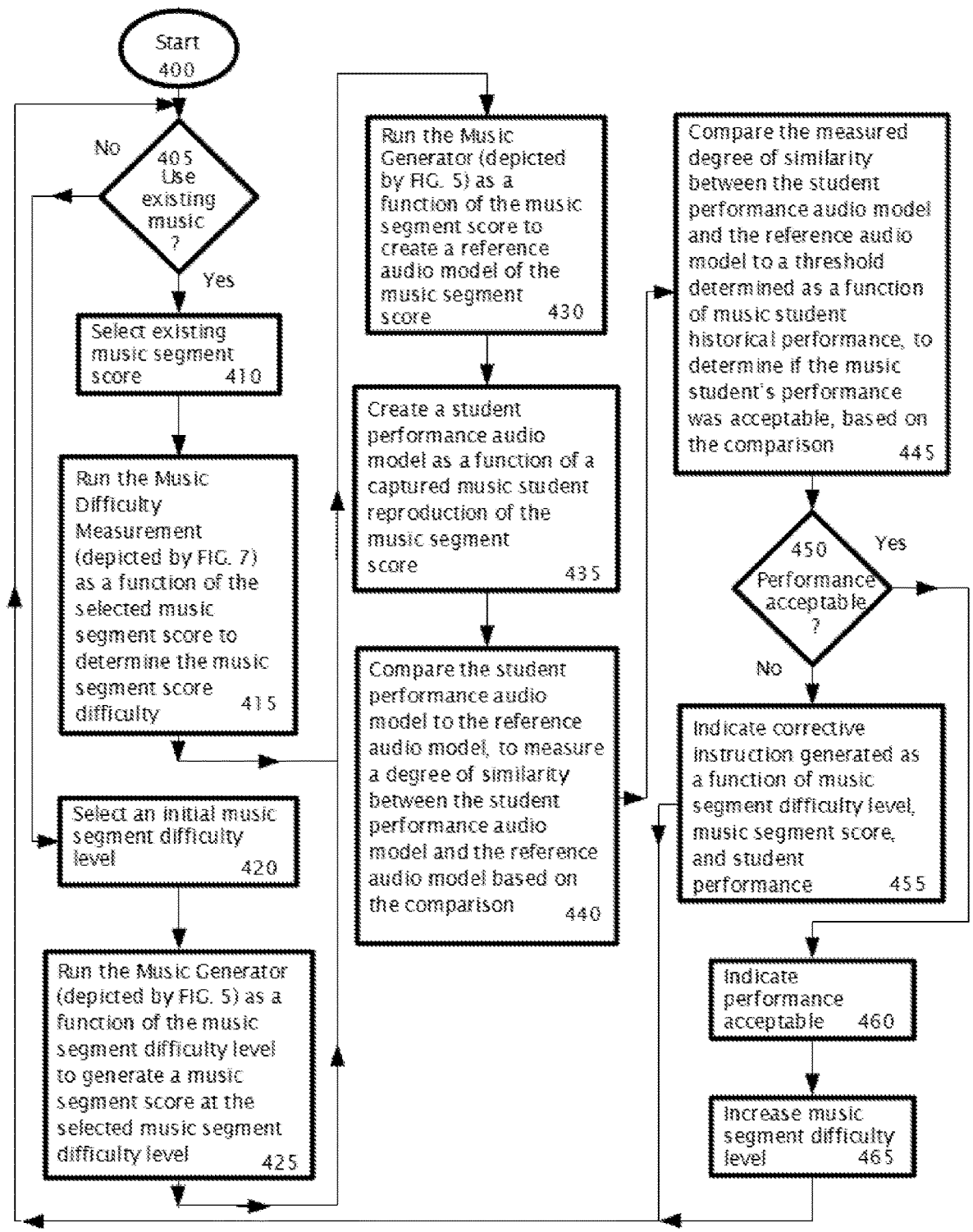
FIG. 4 depicts a process flow of an exemplary Artificially Intelligent Musical Instruction Engine (AIMIE) Sight Reading Trainer implementation.

FIG. 4 depicts a process flow of an exemplary Artificially Intelligent Musical Instruction Engine (AIMIE) Sight Reading Trainer implementation. FIG. 4 depicts a process flow of an exemplary AIMIE Sight Reading Trainer configured in the music instruction device 105 providing an illustrative sight reading lesson to the music student 102. The method depicted in FIG. 4 is given from the perspective of the Artificially Intelligent Musical Instruction Engine (AIMIE) 112 executing as program instructions on the processor (CPU) 305, depicted in FIG. 3. In the illustrated embodiment, the AIMIE 112 executes as program instructions on the processor 305 configured in the music instruction device 105, depicted in at least FIG. 1, FIG. 2, and FIG. 3. In some embodiments, the Artificially Intelligent Musical Instruction Engine (AIMIE) 112 may execute as a cloud service communicatively coupled with system services, hardware resources, or software elements local to and/or external to the music instruction device 105. The depicted method 400 begins at step 405 with the processor 305 performing a test to determine if a sight reading lesson is to be given using existing music. Upon a determination by the processor 305 at step 405 a sight reading lesson is to be given using existing music, the method continues at step 410 with the processor 305 selecting an existing music segment score. In some embodiments, a music segment score menu may be presented to a user. In various designs, a user may select a music segment score for a sight reading lesson. The method continues at step 415 with the processor 305 running the Music Difficulty Measurement (depicted by FIG. 7) as a function of the selected music segment score to determine the music segment score difficulty. The method continues at step 430 with the processor 305 running the Music Generator (depicted by FIG. 5) as a function of the music segment score to create a reference audio model of the music segment score. The method continues at step 435 with the processor 305 creating a student performance audio model as a function of a captured music student 102 reproduction of the music segment score. The method continues at step 440 with the processor 305 comparing the student performance audio model to the reference audio model, to measure a degree of similarity between the student performance audio model and the reference audio model based on the comparison. The method continues at step 445 with the processor 305 comparing the measured degree of similarity between the student performance audio model and the reference audio model to a threshold determined as a function of music student historical performance, to determine if the music student's performance was acceptable, based on the comparison. At step 450 the processor 305 performs a test to determine if the music student's performance was acceptable, based on the comparison performed by the processor 305 at step 445. Upon a determination by the processor 305 at step 450 the music student's performance was not acceptable, the method continues at step 455 with the processor 305 indicating corrective instruction generated as a function of music segment difficulty level, music segment score, and student performance, and the method continues at step 405 with the processor 305 performing a test to determine if a sight reading lesson is to be given using existing music. Upon a determination by the processor 305 at step 450 the music student's performance was acceptable, the method continues at step 460 with the processor 305 indicating acceptable performance. The method continues at step 465 with the processor 305 increasing the music segment difficulty level, and the method continues at step 405 with the processor 305 performing a test to determine if a sight reading lesson is to be given using existing music. Upon a determination by the processor 305 at step 405 a sight reading lesson is not to be given using existing music, the method continues at step 420 with the processor 305 selecting an initial music segment difficulty level. The method continues at step 425 with the processor 305 running the Music Generator (depicted by FIG. 5) as a function of the music segment difficulty level to generate a music segment score at the selected music segment difficulty level. The method continues at step 430 with the processor 305 running the Music Generator (depicted by FIG. 5) as a function of the music segment score to create a reference audio model of the music segment score, and the method continues as described Supra. In an illustrative example, "sight reading" is playing a passage of music from a score without previously studying the score or practicing the passage. In some embodiments, an exemplary sight reading trainer 132 design may display a musical score on a device 105 screen for the user to play. In various embodiments, the musical score may scroll across the screen in time with the music. In some implementations, the microphone 110 may listen to the musician 102 play or attempt to play the notes displayed on the screen, and the sight reading trainer 132 may capture the microphone 110 input. In various embodiments, the sight reading trainer 132 may process a waveform obtained from microphone input so that the user's performance may be directly compared to the notes the user attempted to play, using, for example, techniques including Fourier transformation; the "Puckette" algorithm; Matrix factorization; including non-negative matrix factorization; Neural networks; or Capsule networks. In some embodiments, an exemplary sight reading trainer 132 may compare the processed input to the attempted notes and compute a measurement of similarity. In various designs, an embodiment sight reading trainer 132 may display the result of the comparison to the user, indicating how well they are performing, and adjusts the difficulty of the music subsequently displayed to the user, so that the music's difficulty is commensurate with or slightly more difficult than what the user is able to play.

Figure 5:
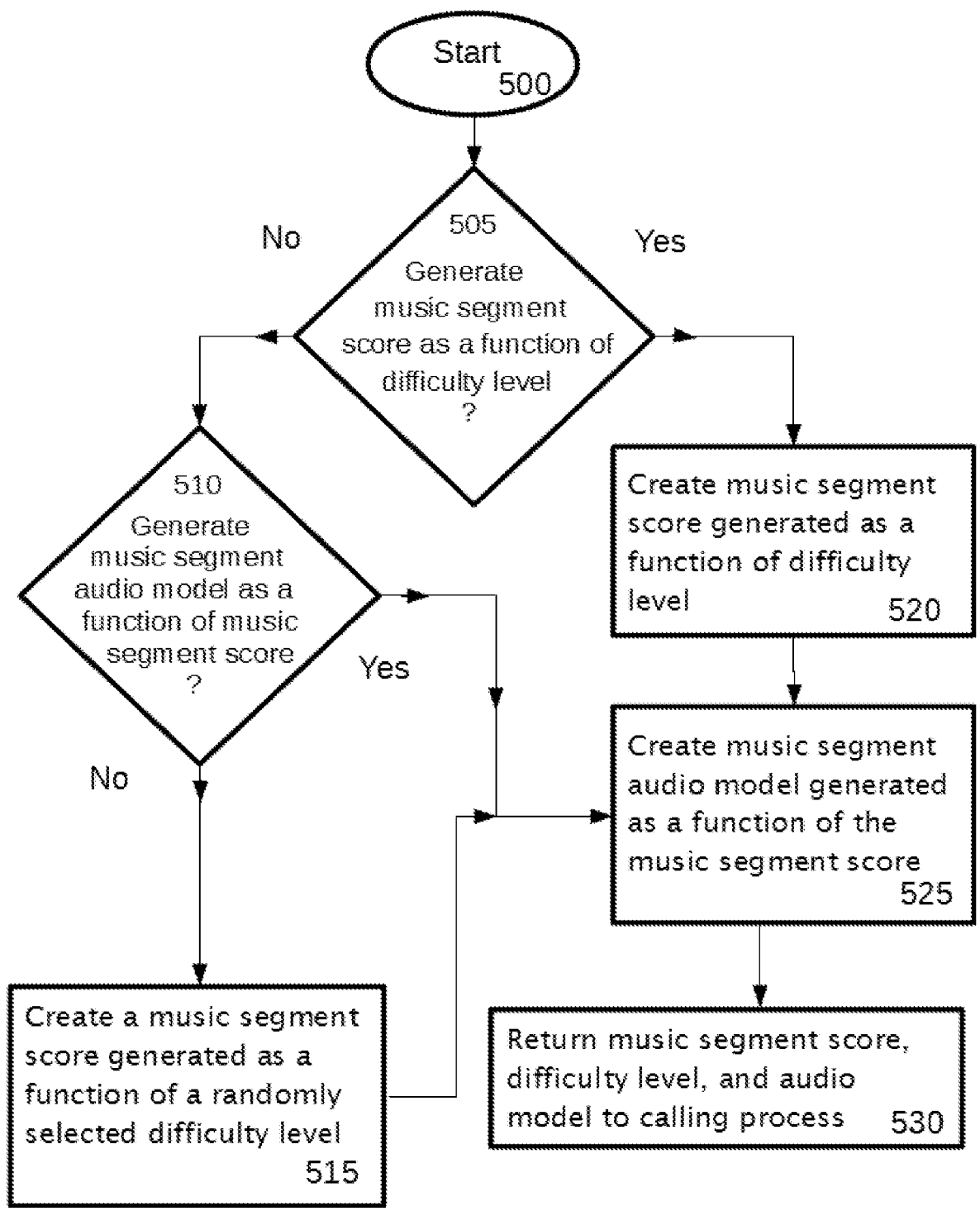
FIG. 5 depicts a process flow of an exemplary Artificially Intelligent Musical Instruction Engine (AIMIE) Music Generator implementation.

FIG. 5 depicts a process flow of an exemplary Artificially Intelligent Musical Instruction Engine (AIMIE) Music Generator implementation. FIG. 5 depicts a process flow of exemplary AIMIE Music Generator music segment score and music segment model creation. The method depicted in FIG. 5 is given from the perspective of the Artificially Intelligent Musical Instruction Engine (AIMIE) 112 executing as program instructions on the processor (CPU) 305, depicted in FIG. 3. In the illustrated embodiment, the AIMIE 112 executes as program instructions on the processor 305 configured in the music instruction device 105, depicted by at least FIG. 1, FIG. 2, and FIG. 3. In some embodiments, the Artificially Intelligent Musical Instruction Engine (AIMIE) 112 may execute as a cloud service communicatively coupled with system services, hardware resources, or software elements local to and/or external to the music instruction device 105. The depicted method 500 begins at step 505 with the processor 305 performing a test to determine if the method was invoked to generate a music segment score as a function of difficulty level. Upon a determination by the processor 305 at step 505 the method was not invoked to generate a music segment score as a function of difficulty level, the method continues at step 510 with the processor 305 performing a test to determine if the method was invoked to generate a music segment audio model as a function of a music segment score. Upon a determination by the processor 305 at step 510 the method was not invoked to generate a music segment audio model as a function of a music segment score, the method continues at step 515 with the processor 305 creating a music segment score generated as a function of a randomly selected difficulty level. The method continues at step 525 with the processor 305 creating a music segment audio model generated as a function of the music segment score, and the method ends at step 530 with the processor 305 returning the music segment score, difficulty level, and audio model to the calling process. Upon a determination at step 510 the method was invoked to generate a music segment audio model as a function of a music segment score, the method continues at step 525 with the processor 305 creating a music segment audio model generated as a function of the music segment score, and the method ends at step 530 with the processor 305 returning the music segment score, difficulty level, and audio model to the calling process. Upon a determination by the processor 305 at step 505 the method was invoked to generate a music segment score as a function of difficulty level, the method continues at step 520 with the processor 305 creating a music segment score generated as a function of difficulty level. The method continues at step 525 with the processor 305 creating a music segment audio model generated as a function of the music segment score, and the method ends at step 530 with the processor 305 returning the music segment score, difficulty level, and audio model to the calling process. In various embodiments, an exemplary Music Generator may generate musical passages intended for a musician to practice playing. In some embodiment designs, an exemplary Music Generator may tailor the difficulty of the generated music to be appropriate for a given user's ability. Various Music Generator embodiment designs may generate music using Markov models or neural networks. In an illustrative example, an embodiment Music Generator may be combined with an embodiment Sight Reading Trainer, configured such that the Sight Reading Trainer displays music generated by the Music Generator. In some examples, an embodiment Music Generator may be combined with an embodiment Music Difficulty Measurement Method to generate music of a specified difficulty. In an illustrative example, an embodiment Music Generator may tailor a composition's difficulty to a specific user's skill level. Some embodiments may advantageously provide unlimited amounts of previously unseen music at low cost for musician practice.

Figure 6A:
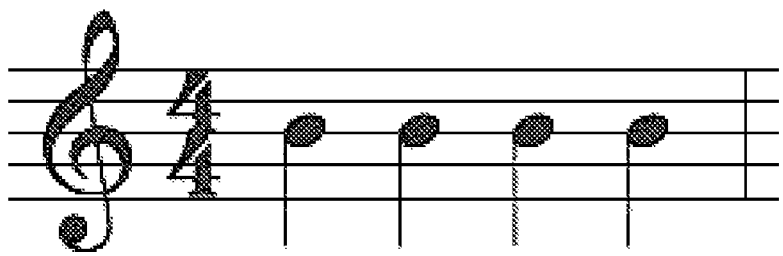
FIGS. 6A-6C depict exemplary musical scores encoding music segments.
Figure 6B:
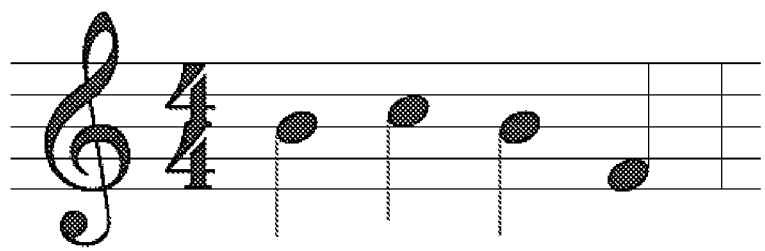
Figure 6C:
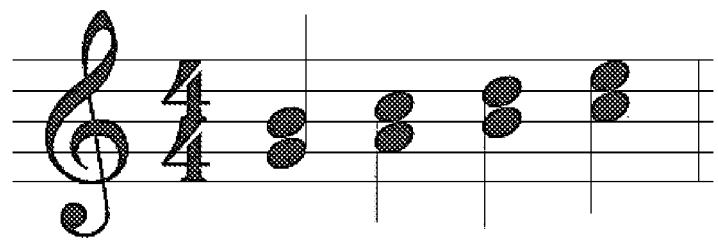

FIGS. 6A-6C depict exemplary musical scores encoding music segments. In an illustrative example, some embodiment Music Difficulty Measurement methods may apply the information-theoretic concept of "entropy" to music. Examples illustrative of various embodiment AIMIE 112 Music Difficulty Measurement method 137 application scenarios will be disclosed with reference to FIGS. 6A-6C. In various exemplary scenarios, some embodiment Music Difficulty Measurement methods may be applied to an entire piece of music by measuring the entire piece as a single segment, or by measuring component segments of the piece and aggregating the measurement by summing, averaging, describing the distribution of segment measurements (for example, percentiles, range, or the like), or other mathematical operations. Some embodiment Music Difficulty Measurement methods may be varied by treating rhythmic and pitch entropy separately, resulting in two distinct measurements for a piece of music. Various embodiments may compute entropy by modeling pitch and rhythm together as a single random variable. Some embodiments may compute entropy by modeling pitch and rhythm as joint random variables. In an illustrative example, some embodiment designs may compute the entropy of a passage of music to measure the difficulty of playing the passage of music. In an illustrative example, it is an object of various embodiments of the present disclosure to improve music instruction technology based on introducing the use of entropy to measure the difficulty of playing a passage of music. As should be recognized by one of ordinary skill in the probability theory or information theory arts, the entropy of a music passage may be computed in various ways, without departing from the herein disclosed improvement introduced to music instruction technology based on the use of entropy to measure the difficulty of playing a passage of music. In various implementations, after entropy is calculated, the entropy measurement may be converted into a measurement that considers the speed at which the music is played, for example, a "bit rate." In an illustrative example, if a segment of music has an entropy of b=2 bits, and is played over a duration of 1 second, the difficulty measurement is 2 bits/second. In another example, if a piece of music has an entropy of b=10 bits, and is played over a duration of 4 seconds, the difficulty measurement is 10/4=2.5 bits/second. In various scenarios, entropy calculated using a different value of b can be equivalently converted. For example, if b=10, then the difficulty may be measured in bans/second. In some embodiments, an exemplary Music Difficulty Measurement method 137 may model a segment of music as a discrete random variable, such that each note in the segment may be considered a possible outcome of the random variable, and the probability of each outcome is proportional to the duration of the corresponding note. In an illustrative example, a single measure (in 4/4 time) with four quarter notes may be modelled as a random variable with 4 equally likely outcomes. In various embodiments, a single measure (in 6/8 time) with 1 dotted-quarter note and 3 eighth notes may be modelled as a random variable with 1 outcome with probability ½, and 3 other outcomes each with probability ⅙. In some embodiments, consecutive notes expressed as a "tie" may be considered a single note for purposes of these exemplary calculations. In an illustrative example, the difficulty of a segment of music may be determined by first computing the entropy of such a random variable.

FIG. 6A depicts an exemplary single measure (in 4/4 time) having four quarter notes. In an illustrative example, an entropy measure of the exemplary music segment depicted by FIG. 6A may be calculated to measure the music segment difficulty:

$$X = \{x_1, x_2, x_3, x_4\} = 4 \text{ quarter notes}$$

$$P(x_i) = 1/4 \text{ for all } x$$

$$\text{Entropy}(X) = -\sum_{i=1}^{n} P(x_i) * \log_b(P(x_i)) = -\sum_{i=1}^{4} (1/4) * \log_2(1/4) = 2 \text{ bits}$$

where n is the number of possible outcomes (4) and b is the base of the logarithm. In various examples, one may choose any positive real value for b not equal to 1. In an illustrative example, a choice of b=2 will measure entropy in "bits." In this example, the pitch of the notes is not relevant.

FIG. 6B depicts an exemplary single measure illustrating three distinct pitches to explain how the pitch and rhythm are considered in embodiment music difficulty measurements based on entropy calculations. The example given with reference to FIG. 6B is similar to the example described with reference to FIG. 6A, however, the pitch of the notes is also considered in the example given with reference to FIG. 6B. In an illustrative example, we define two random variables, one for pitch and one for rhythm, and add the entropy of both pitch and rhythm to determine the entropy of the musical segment. The rhythm of the example given with reference to FIG. 6B is the same as the rhythm of the example given with reference to FIG. 6A, and in view of this, the rhythmic entropy of the example given with reference to FIG. 6B is equal to 2. Turning now with reference to FIG. 6B to pitch entropy calculations, we note there are 3 distinct pitches in this segment illustrated by FIG. 6B (B, C, and F), and in view of this, we define a random variable over the set of pitches:

$Y=\{y_1,y_2,y_3\}=\{B,C,F\}$

The probability is proportional to the total duration of each pitch in the segment. For example:

$P(B)=\frac{1}{2}$ because it sounds for half of the measure.

$P(C) = 1/4$ $P(F) = 1/4$ $\text{Entropy}(Y) = -\sum_{i=1}^{n} P(x_i) * \log_b(P(x_i)) =$
$= -[(1/2)*\log_2(1/2) + (1/4)*\log_2(1/4) + (1/4)*\log_2(1/4)]$
$= 1.5$ $\text{Entropy}(X) + \text{Entropy}(Y) = 2 + 1.5 = 3.5 \text{ bits}$ Note that in the illustrative example given with reference to FIG. 6B, if every pitch in the measure were the same (i.e. only one pitch) then the total entropy would be equal to the rhythmic entropy. In some scenarios, if, for example, each pitch was distinct, with none repeated, then the total entropy would be higher than a case where some pitches are repeated.

FIG. 6C depicts a single measure illustrating exemplary polyphonic music in which more than one pitch can sound at a time. An illustrative example of embodiment polyphonic music difficulty measurements based on entropy calculations is given with reference to FIG. 6C. In the exemplary scenario described, the computation may be split into rhythmic entropy and pitch entropy. In the embodiment described, the rhythmic entropy calculated with reference to FIG. 6C is the same as the rhythmic entropy calculated with reference to FIGS. 6A and 6B, for example, $\text{Entropy}(X)=2$ In the example given with reference to FIG. 6C, an exemplary pitch random variable may be defined over the set of all pitches that appear in this segment:

$Y=\{G,A,B,C,D,E\}$

In an illustrative example, the probability of a given pitch is proportional to its total duration in the segment of music. In various implementations, the duration of a pitch in a measure is measured irrespective of whether any other pitch sounds at the same time. In the illustrative example given with reference to FIG. 6C, G sounds for the length of one quarter note, and B sounds for the length of two quarter notes, in total.

$P(G) = 1/8, P(A) = 1/8, P(B) = 1/4, P(C) = 1/4, P(D) = 1/8,$ $P(E) = 1/8$ $\text{Entropy}(Y) = -\sum_{i=1}^{n} P(x_i) * \log_b(P(x_i))$
$= -[4*(1/8)*\log_2(1/8) + 2*(1/4)*\log_2(1/4)]$
$= 2.5$ The total entropy is therefore:

$\text{Entropy}(X)+\text{Entropy}(Y)=2+2.5=4.5 \text{ bits}$

Figure 7:
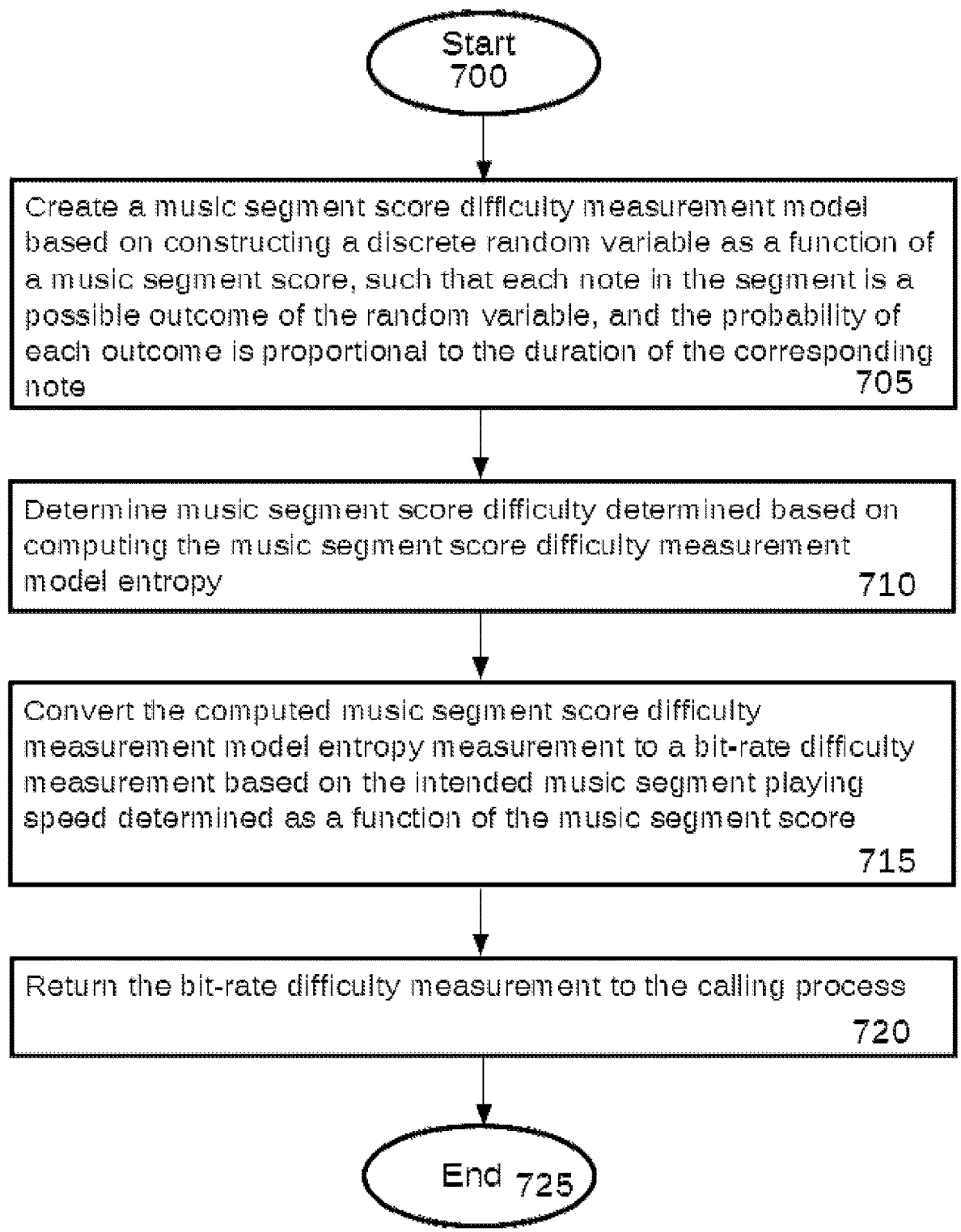
FIG. 7 depicts a process flow of an exemplary Artificially Intelligent Musical Instruction Engine (AIMIE) Music Difficulty Measurement implementation.

FIG. 7 depicts a process flow of an exemplary Artificially Intelligent Musical Instruction Engine (AIMIE) Music Difficulty Measurement implementation. FIG. 7 depicts a process flow of an exemplary AIMIE Music Difficulty Measurement method measuring music segment score difficulty determined as a function of entropy. The method depicted in FIG. 7 is given from the perspective of the Artificially Intelligent Musical Instruction Engine (AIMIE) 112 executing as program instructions on the processor (CPU) 305, depicted in FIG. 3. In the illustrated embodiment, the AIMIE 112 executes as program instructions on the processor 305 configured in the music instruction device 105, depicted in at least FIG. 1, FIG. 2, and FIG. 3. In some embodiments, the Artificially Intelligent Musical Instruction Engine (AIMIE) 112 may execute as a cloud service communicatively coupled with system services, hardware resources, or software elements local to and/or external to the music instruction device 105. The depicted method 700 begins at step 705 with the processor 305 creating a music segment score difficulty measurement model based on constructing a discrete random variable as a function of a music segment score, such that each note in the segment is a possible outcome of the random variable, and the probability of each outcome is proportional to the duration of the corresponding note. The method continues at step 710 with the processor 305 determining the music segment score difficulty determined based on computing the music segment score difficulty measurement model entropy. The method continues at step 715 with the processor 305 converting the computed music segment score difficulty measurement model entropy measurement to a bit-rate difficulty measurement based on the intended music segment playing speed determined as a function of the music segment score. The method continues at step 720 with the processor 305 returning the bit-rate difficulty measurement to the calling process, and the method ends at step 725. In some embodiments, an exemplary Music Difficulty Measurement method may advantageously provide an objective, easily automated, and formulaic music difficulty measurement determined based on information theory.

Although various embodiments have been described with reference to the Figures, other embodiments are possible. In an illustrative example, some embodiment designs may implement a Piece Trainer 140 design. For example, an exemplary piece trainer 140 design may help a musician learn a piece of music. In some piece trainer 140 embodiments, musical passages presented to the user may be from a piece of music specified by the user (instead of exercises selected or generated by an application). In various examples, a piece trainer 140 implementation may repeatedly present segments of the piece to the user, at tempos and durations to match the measured ability of the user. In some embodiments, a piece trainer 140 may track how much of the piece the user has learned and how well the user has learned it. In various examples, an embodiment piece trainer 140 implementation may measure the user's progress on different segments of the piece and make recommendations of what they should practice based on their measured progress. In an illustrative example, an embodiment Piece Trainer 140 may apply various machine learning methods, for example, neural and capsule networks, for more accurate pitch measurements. Various implementations may help a user plan which parts of the piece they should practice. Some designs may combine with a Student Ensemble Manager to share progress with a teacher or ensemble leader.

Some embodiments may provide a Music Corrector 142 design. For example, an embodiment music corrector 142 implementation may record a user attempting to play a passage of music and "correct" the portions of the music which it deems incorrect. In some embodiment music corrector 142 designs, the music corrector 142 may play back the corrected portions of the recording to demonstrate to the user how to correctly play the passage. In various music corrector 142 embodiments, a corrected version of the recording may be synthesized by combining the originally recorded segment and a pretrained model of what the user's instrument sounds like. In an illustrative example, some embodiment music corrector 142 pretrained models may be, for example, an "NMF" (non-negative matrix factorization) model, or, a neural network.

Various designs may include a Memory Trainer 145 embodiment. For example, some embodiment memory trainer 145 designs may help improve a user's working memory, fluid intelligence, ability to sight read, and ability to memorize passages of music. Various memory trainer 145 embodiments may include an adaptation of an "n-back" memory task. In an embodiment adaptation of an "n-back" memory task, an exemplary memory trainer 145 design may present a sequence of musical stimuli to the user and instruct the user to indicate when a musical stimulus is the same as one from n-steps earlier in the sequence. In an illustrative example, stimuli may include notes, chords, rests, or sequences of these, displayed on a staff or staves; and, recordings of notes, chords, rests, or musical passages played through a speaker or headphones for the user to hear. In some exemplary memory trainer 145 embodiment scenarios, sequences may be deemed to "match" based on varying criteria, including: pitch, duration, rhythmic pattern, patterns of pitch-intervals, or timbre. In some designs, a user may indicate a match by doing any of the following: pressing a button or part of the device's screen or playing back the musical stimuli. In some implementations, musical stimuli played back by a user may be captured by the memory trainer 145 microphone 110 and measured for accuracy in a manner similar to the Sight Reading Trainer 132.

In an illustrative example, some embodiment implementations may include a Student Ensemble Manager 149 design. For example, an embodiment student ensemble manager 149 design may pair with a Sight Reading Trainer 132 and Piece Trainer 140 to allow a music teacher to track how their students are progressing through the Sight Reading Trainer 132 and Piece Trainer 140 lessons. In some exemplary student ensemble manager 149 implementation scenarios, when more than one of a teacher's students are learning the same piece of music, an embodiment student ensemble manager 149 may aggregate the students' achievement metrics to show which parts of the piece and which aspects of their playing (such as, for example, long tones, or arpeggios) the students can play well or poorly. In various embodiment student ensemble manager 149 examples, a teacher may see on a note-by-note and measure-by-measure level how each student, each group of students, each section of their ensemble (such as, for example, the violins) are doing. In illustrative examples, an embodiment student ensemble manager 149 may show: the trumpet section is on average slightly behind the beat on the 3rd beat of the second measure of a piece; the violins practiced on average 2 hours per user in the last week; and, the cellos tend to play the first note in the fifth measure too sharp. In some embodiments, student achievement metrics may be sourced from other applications, such as a Sight Reading Trainer 132, a Piece Trainer 140, or a Memory Trainer 145. Some student ensemble manager 149 embodiments may aggregate many students' performance to show how a group of students are performing on the same segments of music, allowing a teacher to know fine-grained details about his/her students' practice before they meet for a lesson or rehearsal.

Some embodiment designs may provide a Long Tones Trainer 150 implementation. For example, an embodiment Long Tones Trainer 150 design may help players of wind instruments, such as, for example, trumpet, or clarinet, practice "long tones." In an illustrative example, "long tones" may be a specific exercise practiced by wind players, during which they play each note on their instrument as long as possible while maintaining proper intonation and tone quality. Some embodiment Long Tones Trainer 150 designs may measure how long the user plays each note. In various embodiments, an exemplary Long Tones Trainer 150 may measure the intonation of each note at repeated intervals. Various designs may display to the user their intonation quality for each note in aggregate, at each point of each note (for example, "+10 Hz at second 3", "−5 Hz at second 5"), and for various ranges of notes (for example, octave 3, octave 5), using text, graphs, or other visualizations. Some implementations may display a measure of the user's tone quality for each note. Some embodiments may measure tone quality by comparing the power spectrum of the recorded audio to a predetermined baseline power spectrum. Various designs may display measurements of their tone quality for each note and advice for how to improve their tone. In an illustrative example, an embodiment Long Tones Trainer 150 design may indicate "Notes in octave 5 sound pinched, so you should try straightening your posture and positioning your clarinet more vertically." In various embodiments, a Long Tones Trainer 150 design may provide a unified tool to practice long tones, without using a separate tuner and timer Various implementations may include a music generator design adapted to configure or train the music generator to generate music of a specific style, for example, jazz, pop, classical, or rock. In some designs, the music generator may be configured to adapt the generated music to incorporate specific stylistic elements, such as, for example, arpeggios, or parallel octaves.

In some embodiments, an exemplary sight reading trainer 132 may apply various machine learning methods, such as, for example, neural and capsule networks, for more accurate pitch measurements. Some embodiment sight reading trainer 132 designs may combine with a Music Generator and Music Difficulty Measurement Method to supply an infinite amount of practice music which is tailored to the user's skill level. Various embodiment sight reading trainer 132 designs may combines with a Student Ensemble Manager to share progress with a teacher or ensemble leader.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises", and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112

(f). Specifically, any use of "step of" in the claims herein is not intended to invoke the provisions of 35 U.S.C. § 112 (f).

According to an embodiment of the present invention, the system and method may be accomplished through the use of one or more computing devices. As depicted, for example, at least in FIG. 1, FIG. 2, and FIG. 3, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute", and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A process for music instruction, comprising:
capturing a performance of a musical score;
comparing a musical score model to the captured performance of the musical score;
determining a degree of difficulty for the musical score, wherein the musical score degree of difficulty is determined based on modeling a segment of the musical score as a discrete random variable, wherein each note in the segment is a possible outcome of the random variable, and wherein the probability of each outcome is proportional to the duration of the corresponding note;
determining an entropy for the musical score; and
automatically evaluating the captured performance based on musical score degree of difficulty determined as a function of the musical score entropy.

2. The process of claim 1, wherein the musical score model is determined as a function of the musical score.

3. The process of claim 1, wherein the musical score model further comprises a model determined as a function of frequency-domain analysis.

4. The process of claim 1, wherein the musical score is selected based on the musical score degree of difficulty.

5. The process of claim 1, wherein the process further comprises:
presenting the musical score to a student; and,
capturing a representation of audio energy from the student's performance of the musical score.

6. The process of claim 1, wherein comparing a musical score model to a captured performance of the musical score further comprises at least one model determined as a function of a music characteristic selected from the group consisting of pitch, volume, and rhythm.

7. The process of claim 1, wherein the process further comprises repeating the process with a musical score selected as a function of the captured performance evaluation.

8. The process of claim 1, wherein the captured performance of the musical score further comprises the performance of the musical score captured by a microphone.

9. An apparatus for musical instruction, comprising:
one or more processors; and
a memory connected to the one or more processors and encoding computer readable instructions, including processor executable program instructions, the computer readable instructions accessible to the one or more processors, wherein the processor executable program instructions, when executed by the one or more processors, cause one or more processors to perform operations comprising:
capture a performance of a musical score;
compare a musical score model to the captured performance of the musical score;

determine a degree of difficulty for the musical score, wherein the musical score degree of difficulty is determined based on modeling a segment of the musical score as a discrete random variable, wherein each note in the segment is a possible outcome of the random variable, and wherein the probability of each outcome is proportional to the duration of the corresponding note;

determine an entropy for the musical score; and automatically evaluate the captured performance based on musical score degree of difficulty determined as a function of the musical score entropy.

10. The apparatus of claim 9, wherein the operations performed by the one or more processors further comprise determining the musical score entropy based on a numerical analysis of the musical score.

11. The apparatus of claim 9, wherein the musical score entropy is measured as a function of bits per second.

12. The apparatus of claim 10, wherein the musical score entropy further comprises rhythmic entropy and pitch entropy.

13. An apparatus, comprising:

a processor;

a microphone, operably connected to the processor;

a user interface, operably connected to the processor; and, a memory processor and encoding computer readable instructions, including processor executable program instructions, the computer readable instructions accessible to the processor, wherein the processor executable program instructions, when executed by the processor, cause the processor to perform operations comprising:

construct a musical score generated as a function of a predetermined musical score degree of difficulty;

construct a musical score model determined as a function of the generated musical score;

present the musical score to a music student, via the user interface;

capture, via the microphone, a representation of audio energy from a performance of the musical score;

compare the musical score model to the captured performance of the musical score performed;

calculate a degree of similarity between the musical score model and the captured performance based on the comparison;

evaluate the captured performance based on musical score degree of difficulty determined as a function of the musical score entropy, wherein the musical score degree of difficulty is determined based on modeling a segment of the musical score as a discrete random variable, wherein each note in the segment is a possible outcome of the random variable, and wherein the probability of each outcome is proportional to the duration of the corresponding note; and, provide via the user interface to the music student feedback determined as a function of the calculated degree of similarity between the musical score model and the captured performance.

14. The apparatus of claim 13, wherein the operations performed by the processor further comprise:

determining if the performance was acceptable based on comparing the degree of similarity to a predetermined performance metric minimum level;

upon a determination the performance was acceptable, increasing the predetermined musical score degree of difficulty; and, repeating the operations performed by the processor.

15. The apparatus of claim 14, wherein the operations performed by the processor further comprise: upon a determination the performance was not acceptable, decreasing the predetermined performance metric minimum level.

16. The apparatus of claim 13, wherein the musical score entropy further comprises rhythmic entropy and pitch entropy.

* * * * *